No. 671,832. Patented Apr. 9, 1901.
E. J. MANNING.
FLOOR MAT.
(Application filed Jan. 29, 1901.)
(No Model.)

WITNESSES:
T. W. Johnson
F. J. F. Johnson

INVENTOR
E. J. Manning
BY
J. R. Nottingham
ATTORNEY

THE NORRIS PETERS CO., PHOTO-LITHO., WASHINGTON, D. C.

UNITED STATES PATENT OFFICE.

EBEN J. MANNING, OF LAKE CITY, MINNESOTA.

FLOOR-MAT.

SPECIFICATION forming part of Letters Patent No. 671,832, dated April 9, 1901.

Application filed January 29, 1901. Serial No. 45,231. (No model.)

*To all whom it may concern:*

Be it known that I, EBEN J. MANNING, a citizen of the United States, residing at Lake City, in the county of Wabasha and State of Minnesota, have invented certain new and useful Improvements in Floor-Mats; and I do hereby declare the following to be a full, clear, and exact description of the invention, such as will enable others skilled in the art to which it appertains to make and use the same.

My invention relates to that class of mats which are constructed entirely of metal; and it consists, essentially, in forming a mat of a series of metallic meshes hinged together, each mesh being composed of four segments or sections pivotally joined together.

The invention further consists of the general construction of the meshes and the manner of arranging them to form the mat.

The principal object of the invention is to produce a flexible metal mat capable of being rolled or folded lengthwise or crosswise and that will conform itself to uneven surfaces without warping or curling.

Other objects will become apparent upon further description of the invention.

Figure 1:
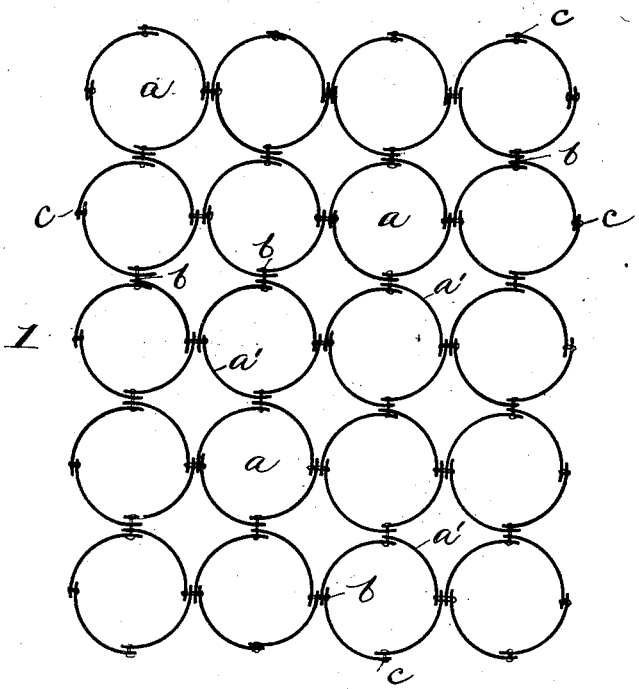
Figure 2:
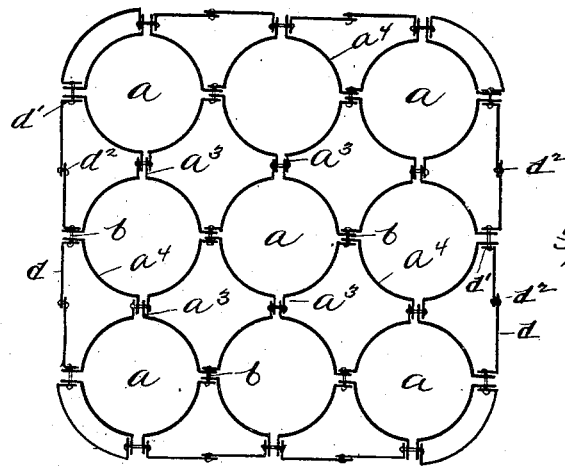
Figure 3:
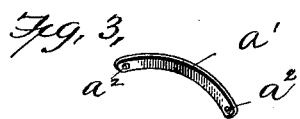

In the accompanying drawings, Figure 1 is a plan view of a mat, showing one form of my invention; Fig. 2, a similar view showing another form of my invention; Fig. 3, a perspective view of one of the mesh-sections forming the mat shown in Fig. 1, and Fig. 4 a similar view of one of the mesh-sections forming the mat shown in Fig. 2.

In the several views the letter $a$ indicates a metal mesh composed of four sections or parts $a'$, each part consisting of a band or strip of suitable width, bent into any desired shape, preferably a segment of a circle, having a perforation $a^2$ in each end. A sufficient number of the meshes $a$ to form a mat of the required size are pivotally joined together by rivets $b$, each rivet passing through the ends of four sections or, in other words, the ends of two sections of each adjacent mesh. The border-sections are pivotally joined together by rivets $c$. As thus joined together it will be noticed that the mat can be folded or rolled either lengthwise or crosswise.

Figure 4:

In the form of mat shown in Figs. 2 and 4 the sections $a^4$ of each mesh have their respective ends bent outwardly, as shown at $a^3$, the meshes being pivotally joined together by the rivets $b$, as in the form shown in Fig. 1. The mat shown in Fig. 2 is preferably provided with a border composed of a series of sections $d$, having one of their ends bent inwardly, as shown at $d'$, so as to be pivotally joined to the bent ends of the sections forming the outer row of meshes of the mat, the other ends of the border-sections overlapping each other and being pivotally joined together by rivets $d^2$.

Having thus fully described my invention, what I desire to secure by Letters Patent is—

1. A metallic mat composed of a series of meshes, each mesh consisting of four bands or strips, bent into any desired shape, pivotally joined together by rivets, whereby the mat may be rolled or folded either lengthwise or crosswise.

2. A metallic mat composed of a series of meshes, each mesh consisting of four bands or strips, bent into desired shape with their ends turned outwardly, hinged together by rivets, and a sectional border hinged together and to the ends of the sections forming the outer row of meshes.

In testimony whereof I affix my signature in the presence of two witnesses.

EBEN J. MANNING.

Witnesses:
W. A. HUBBARD,
W. C. WISE.